July 5, 1932. K. E. LYMAN 1,865,772
AUTOMATIC CLUTCH
Original Filed Oct. 5, 1928  2 Sheets-Sheet 2
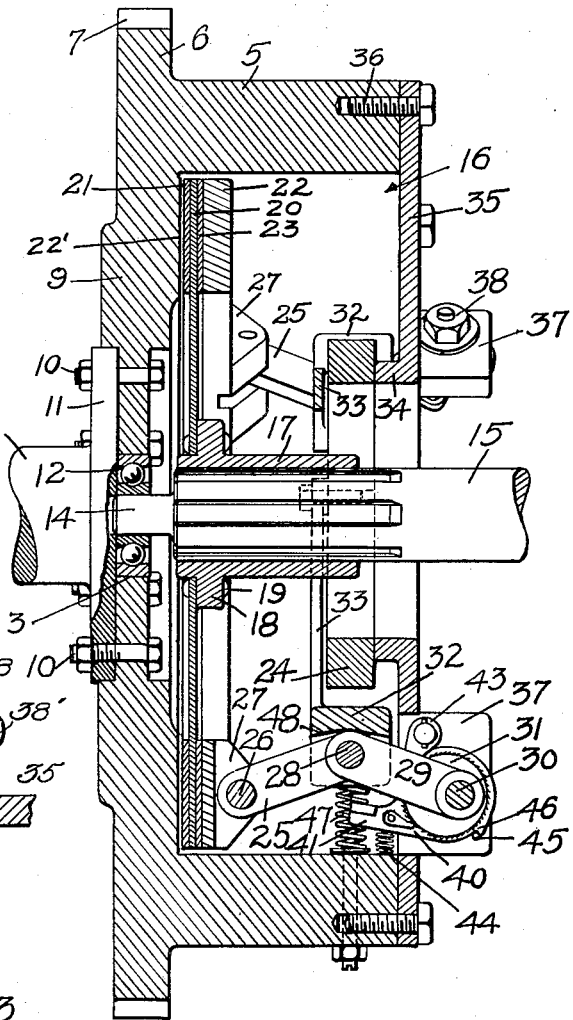
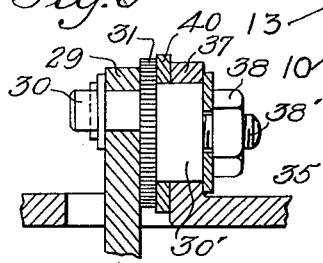
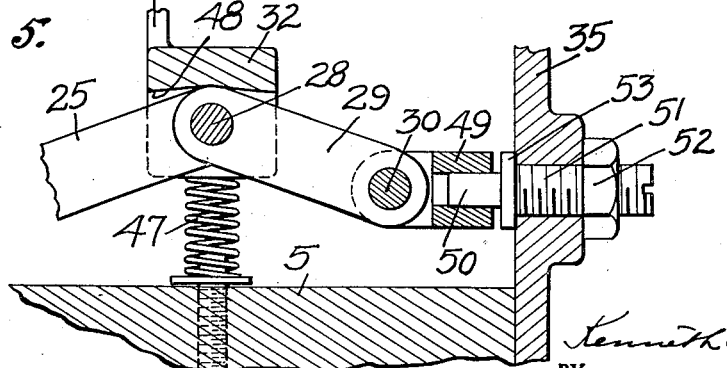
INVENTOR.
Kenneth E. Lyman
BY
ATTORNEY.

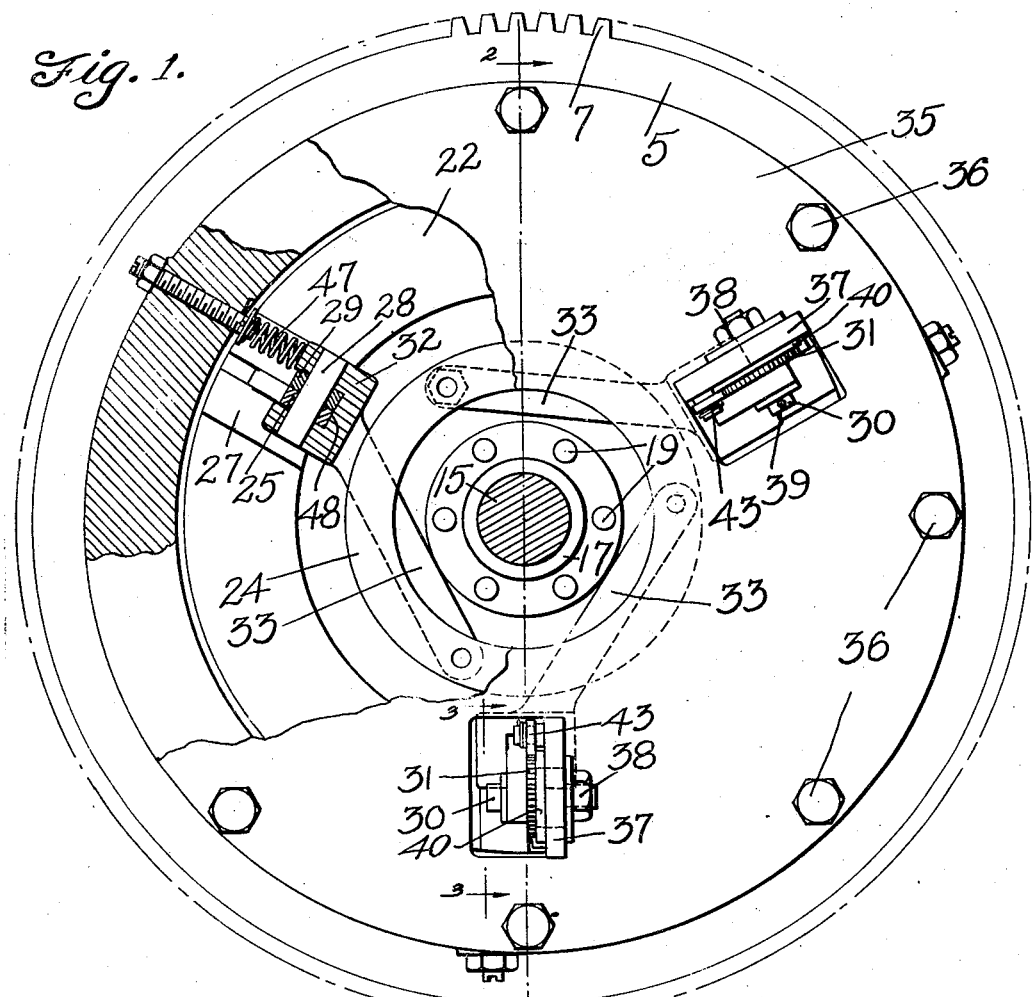
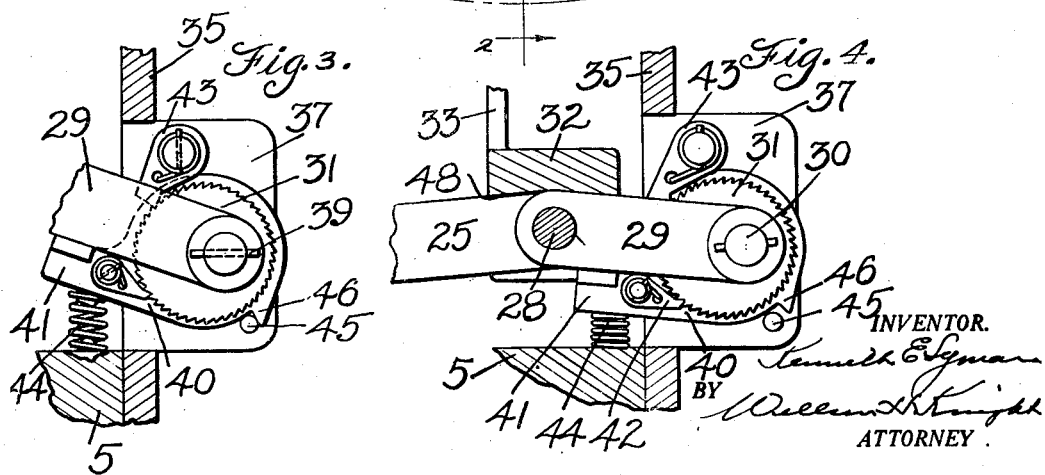

Patented July 5, 1932

1,865,772

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC CLUTCH

Application filed October 5, 1928. Serial No. 310,477. Renewed November 30, 1931.

My present invention relates in general to power transmissions and has particular reference to an automatic clutch for interrupting the drive in such transmissions. The primary object of my invention is to provide an improved automatic clutch of the class described, preferably of the friction type and so constructed that it may be incorporated in a flywheel structure without sacrificing its effectiveness or otherwise departing from a practical solution of the problems involved.

One of the principal objects of my invention is to provide a centrifugally operated automatic clutch of the friction type with means coacting therewith for automatically compensating for the wear between the friction surfaces of the clutching elements.

Still another object of the invention is to provide an automatic clutch of the centrifugally operated friction type in which the aforesaid adjustment for compensating for the wear of the friction members may be manually regulated instead of being automatically controlled.

Still a further object of the invention is to provide an assembly in which the majority of the parts may be inexpensively made so as to reduce the cost of manufacturing the device.

With these and other objects in view the invention will be more readily understood upon reference to the accompanying drawings in which I have illustrated two practical embodiments.

In said drawings:

Fig. 1 is a view in rear elevation of the clutch with parts broken away to illustrate the construction and operation of the same;

Fig. 2 is a view in vertical section of the clutch taken on the line 2—2 Fig. 1;

Fig. 3 is a detailed view in side elevation of the automatic adjusting mechanism the view being taken on the line 3—3 Figure 1;

Fig. 4 is also a detailed view in side elevation of the automatic adjusting mechanism showing the same in a different position of adjustment.

Fig. 5 is a detailed view of the manual adjusting mechanism, and

Figure 6 is a detailed view in section showing the mounting for the links and ratchet mechanism.

Referring now to the drawings in detail: 5 represents a conventional type of flywheel having the radial flange 6 along one edge on which the teeth 7 are provided. The driving shaft 8 is connected to the circular front wall 9 of the flywheel by means of bolts or the like 10 which clamp the plate 11. A suitable ball-bearing or other anti-friction device 12 is confined in an axial opening 13 in the wall 9 of the flywheel to provide a journal bearing for the pilot 14 of the driven shaft 15. In this way the flywheel 5 is mounted with freedom of rotation relatively to the driven shaft 15 when the clutch is disengaged. The flywheel is made as a drum like structure having an interior area 16 in which the majority of the operating parts of the clutch are housed. Splined on the driven shaft 15 is a sleeve 17 which has a radial flange 18 inset somewhat from the forward end of the sleeve. Riveted or otherwise secured to this flange as at 19 is a friction plate 20 which is backed on one side by friction material 21 and by a like material 23. This plate 20 is gripped between the pressure ring 22 and the surface 22′ on the inside surface of the wall 9.

The shiftable friction element of the clutch comprising the member 22 is axially shiftable by centrifugally operated toggle link devices, preferably three in number and adapted to operate in synchronism by means of their attachment to a floating control ring 24 which is concentrically positioned relative to the member 22 and the driven shaft 15. Each of these toggle link devices, preferably comprises a link 25 pivoted as at 26 at one end between bosses or ears 27 projecting from the face of the member 22. The opposite ends of these links 25 are pivoted as at 28 to which is also pivoted one end of the links 29. The opposite ends of each of the links 29 are pivoted as at 30 to a ratchet wheel 31. The ends of the links 25 and 29 which are pivoted as at 28 are connected to a bifurcated weighted mass 32, one of which is carried on the end of each of the connecting arms 33. These connecting arms are pivotedly connected to the face of the floating control ring 24. The ring in this connection has bearing contact with the termination of the sleeve 34 on the inside of the cover plate 35. The cover plate is attached to the drum 5 by bolts or the like 36 to inclose the drum and the parts contained therein.

The pivot pin 30 for each of the links 29 also projects excentrically through the ratchet 31. Each of these pins are formed on one side of a bearing 30' which extends through a supporting block 37 and also supports a tripping cam 40. A threaded pin 38' projects from the opposite side of a bearing 30 to accommodate a nut 38.

From this it will be seen that the pins 30 and 38' are all integral and provide a convenient way of assembling this part of the device.

Mounted on one side of the tripping cam 40 is a pawl 42 which is under the influence of the spring which holds the same in engagement with the ratchet teeth of wheel 31. Another pawl or dogging device 43 is mounted on the blocks 37 which is also spring urged to hold it in engagement with the ratchet teeth of wheel 31. A compression spring 44 bears against the tripping cam 40 to urge it in the direction of the links 25 and 29 and with the influence of this spring arrested by means of the pins 45 abutting against the detents 46 on the tripping cams. It is, of course, understood that each of the toggle link devices is equipped with one of these tripping cams and the parts associated therewith.

In operation, rotation of the driving shaft 8 by a prime mover will rotate the flywheel 5 and with the clutch disengaged as shown in Fig. 2, there will be no power transmitted to the driven shaft 15 up to a pre-determined speed of the driving shaft. When the driving shaft exceeds a predetermined speed, the centrifugal weights 32 will respond to centrifugal force and move outwardly and thus moving outwardly, they will impart a thrust to the links 25 and 29 at the pivots 28 and since the ends of the links 29 are fixed, the action of the links being moved by the centrifugal weights 32 will slide the sleeve 17 on the splined area of the driven shaft 15 to clutch the driven shaft 15 with the flywheel thus establishing a drive between the driving shaft 8 and the driven shaft 15. The straightening out, so to speak, of the links is against the resistance of the coil springs 47 so that when the speed of the driving shaft is retarded and the resistance of the springs 47 overcomes the centrifugal force of the weights 32, the springs will break the toggle and disengage the clutch. It is, of course, understood that since the links are connected to the weights 32, the inward movement of the weights as the centrifugal force diminishes will be a controlling factor in cooperation with the influence of the springs 47 for disengaging the clutch.

For all practical purposes it will be necessary to provide a positive stop to absolutely limit the extension of the links when the clutch is being engaged, the purpose being to prevent the links from going by center and even to prevent them from going to center. This positive stop is provided for by constructing the weights 32 with a compound beveled surface area 48 against which the edges of the links bear at the pre-determined limit of their extended position.

Referring now, to the automatic adjustment to compensate for the wear between the friction surfaces of the clutch, it will be assumed for the purpose of explanation and illustration that the links 25 and 29 assume a 20° angle when the clutch is released and a 10° angle when the clutch is engaged. Attention is called to the fact that there is normal clearance between the abutments on the heels 41 of the tripping cams and the links when the links assume a 10° angle with the clutch in. As a result of wear on the friction surfaces of the clutch, it is of course obvious that the links will straighten out beyond a 10° angle and when the wear is sufficient to permit them to assume a 5° angle, the links 29 will contact with the abutments on the heels 41 of the tripping cams. With the relative adjustment of the tripping cams, the links may assume a 5° angle and bear against the heels 41 of the tripping cams rotating the cams, which will rotate the ratchet wheels 31 by reason of the pawls 42 engaging the teeth thereof, changing the centers of the pivots 30 and giving the links a wider range of movement to compensate for the wear on the friction surfaces. Any such rotative adjustment of the ratchet wheels 31 will be maintained by means of the pawls 43 which prevent reverse rotation of the wheels.

Fig. 4 illustrates a position that the parts will assume when the links have extended to a 5° angle and have effected an automatic self adjustment. When the links are moved out of contact with the heels of the tripping cams, the springs 44 return the cams to their normal position of adjustment with the influence of the springs arrested by the stops 45. It will thus be seen, that while the links are self adjustable, yet they are always maintained under control of the positive stop provided by the compound bevel surface on the weights 32 so that they will never go to center.

Fig. 2, as previously stated, shows a 20° angle of the links, Fig. 3 a 10° angle and Fig. 4 a 5° angle. As the ratchet wheels 31 have been rotated into their adjusted position, the pawls 42 will ride over the teeth of the wheels, permitting the cams to return to their normal position under the influence of the springs 44. Thus the cams return to their normal position and are arrested by the stops 45 while the ratchet wheels are held in their adjusted positions.

Fig. 5 illustrates a practical way of manually adjusting the effective leverage of the links and in which construction the pivots 30 or the links 29 cooperate with collars 49 which are slidably mounted on the pilot stems 50 on the ends of the threaded bolts or the like 51. The bolts are provided with machine threads so that they may be threaded through openings in the cover plate 35 and adjusted by turning the same to the left or right as the case may be. Adjustment may be maintained by nuts or the like 52. For turning the bolts 51 a screw driver or the like may be used or in lieu thereof a thumb screw may be provided for this purpose. The bolts 51 are further provided with a disc or some other suitable abutment 53 to provide stops in one direction for the sliding movement of the collars 49. With this adjustment the bolts 51 may be turned so as to move the centers of the pivots 30 into various positions of adjustment as will be required to compensate for the wear of the friction surfaces.

From the above it will be seen that the friction clutching element of the mechanism is automatically controlled by a centrifugal device or devices which is connected thereto through the medium of a thrust imparting link motion which is self-adjustable to regulate its effective leverage in response to the wear on the friction surfaces. The same principle of operation holds true in the modified form of the invention except that the effective leverage of the thrust imparting link motion is manually adjusted.

Most of the parts may be produced from metal stampings which will reduce the cost of production and yet develop a satisfactory device.

Having thus described and shown an embodiment of my invention, what I claim and desire to secure by Letters Patent of the United States is:

1. In a clutch, friction elements contributing to a clutching connection between driving and driven members, means for moving one of said clutching elements into clutching engagement with the other, comprising a thrust imparting link motion, an eccentrically mounted pivot for said link motion and means for changing the position of said pivot for regulating the effectiveness of the link motion to compensate for wear between said friction elements, comprising a ratchet wheel on which said pivot is eccentrically mounted and means for rotating said ratchet wheel.

2. In a clutch, friction elements contributing to a clutching connection between driving and driven members, means for moving one of said clutching elements into clutching engagement with the other, comprising a thrust imparting link motion, an eccentrically mounted pivot for said link motion and means for changing the position of said pivot for regulating the effectiveness of the link motion to compensate for wear between said friction elements, comprising a ratchet wheel on which said pivot is eccentrically mounted and means positioned in the path of movement of said link motion for rotating said ratchet wheel.

3. In a clutch having a movable clutching element the combination of means for automatically operating said element, comprising a centrifugally responsive mechanism including a plurality of self-adjusting toggle links and means for causing said links to impart a thrust to said clutching element in synchronism.

4. In a clutch having a movable clutching element the combination of means for automatically operating said element, comprising a centrifugal responsive mechanism including a plurality of self-adjusting toggle links and means for causing said links to impart a thrust to said clutching element in synchronism, comprising a floating control member providing a carrier common to all of said links.

5. In a clutch having a movable clutching element, the combination of means for automatically operating said element, comprising a plurality of centrifugally responsive arms, spring influenced toggle links connected to said clutching element and said centrifugally responsive arms and means for automatically adjusting said toggle links to compensate for wear on said clutching element, comprising a ratchet device to which said links are pivotally connected and means for automatically actuating said ratchet device for changing the position of said pivot.

Signed at Rockford, Illinois, this 3rd day of October, 1928.

KENNETH E. LYMAN.